Feb. 13, 1968   R. W. DUNCAN   3,368,544
SELF-CLEANING GRILL AND INSTANT CHARCOAL LIGHTER
Filed Jan. 10, 1966
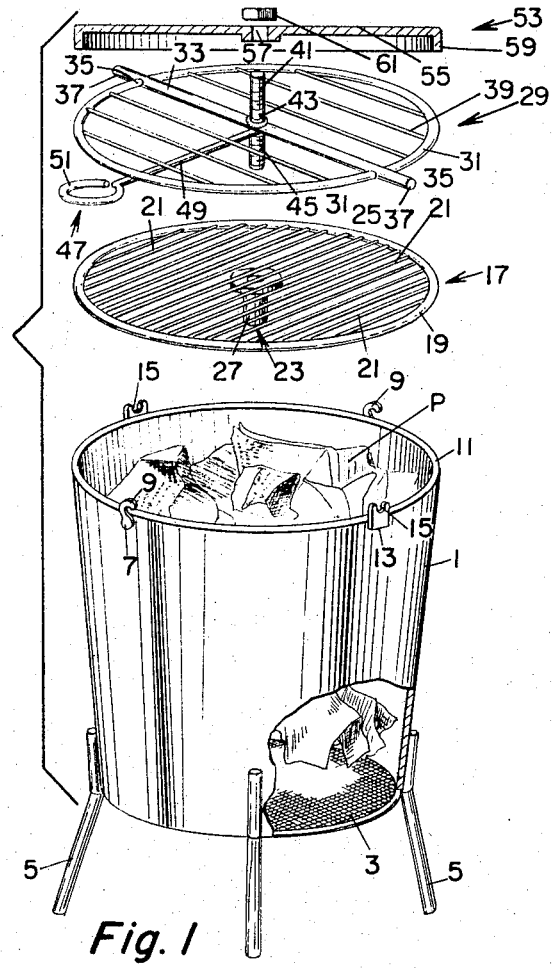
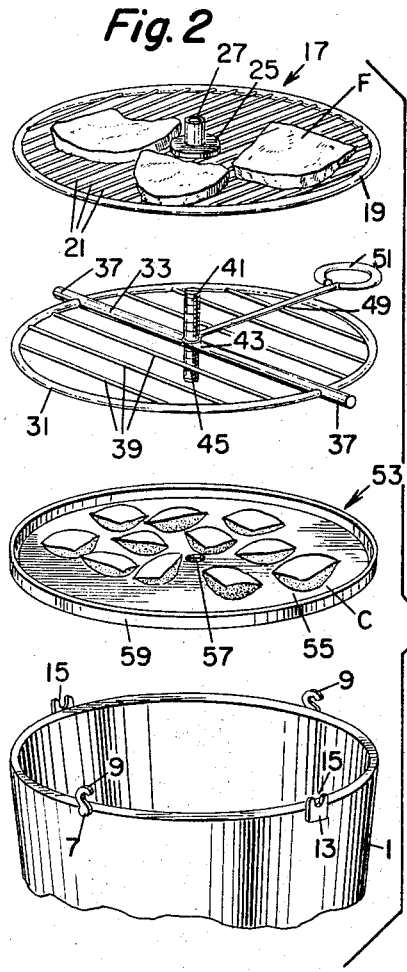
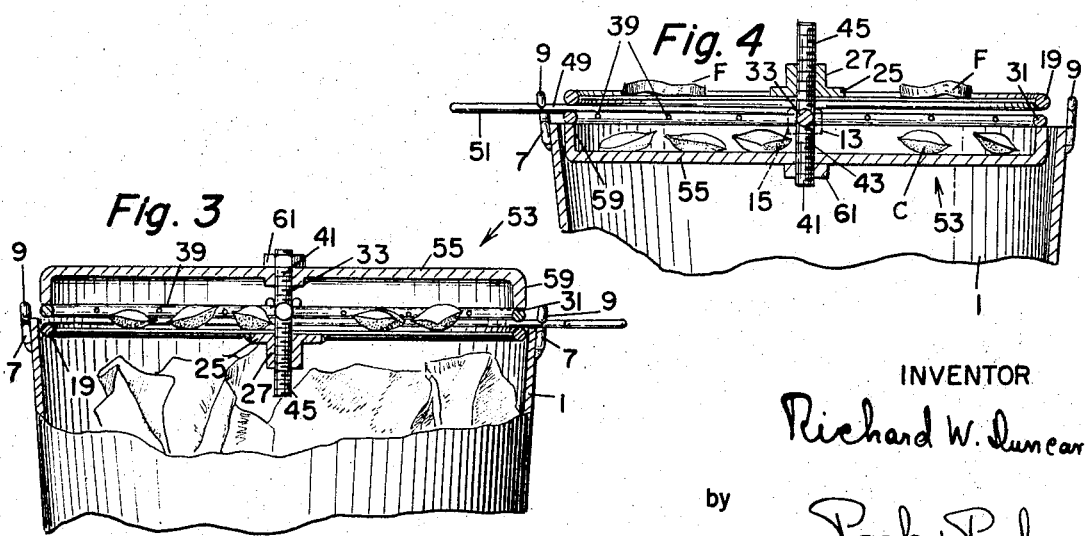
INVENTOR
Richard W. Duncan
by
Peck & Peck
ATTORNEYS

United States Patent Office

3,368,544
Patented Feb. 13, 1968

3,368,544
SELF-CLEANING GRILL AND INSTANT
CHARCOAL LIGHTER
Richard W. Duncan, 4272 Down Ridge Road,
Palm Beach Gardens, Fla.
Filed Jan. 10, 1966, Ser. No. 519,715
12 Claims. (Cl. 126—25)

This invention relates broadly to the art of grills, in the nature of barbecue grills, which are now enjoying great popularity for cooking out, and in its more specific aspects, it relates to such a grill which is self-cleaning and greatly facilitates and reduces the time element in the cooking and broiling of foodstuffs on portable grills; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

One of the many problems which are inherent in the charcoal barbecue grills which are now on the market resides in the fact that substantial difficulty is encountered in igniting the charcoal unless relatively expensive means are employed for causing such charcoal ignition. Not only are such means relatively expensive, but they are also often times inconvenient to use, and certain types of them are somewhat dangerous if not used properly, and also in some instances, taint in the foodstuffs being cooked results. For instance, anyone who has practiced cooking upon the usual charcoal grill of commerce will recognize that it is quite difficult and time consuming to cause the charcoal to ignite merely by the use of paper or similiar types of combustible material, and they will also recognize that the use of combustible liquid fuels which are poured or sprayed upon the charcoal emit an odor which may well be transferred to the foodstuff being broiled or cooked to make it distasteful to the consumer.

Another method which is currently being employed to ignite the charcoal is to use an electric heating iron which is laid in the bed of charcoal; however, it will be apparent that this is not only expensive in the initial cost of the electric heating iron, but also in the use of electricity, and furthermore, in many instances, there is no electrical outlet convenient to the area in which the cooking is to take place. All of these prior methods require a substantial amount of work and effort on the part of the person starting the fire, which, of course, is objectionable and takes some of the pleasure out of the use of the grill.

I have overcome the aforesaid and other disadvantageous characteristics and features of prior grills by providing a novel and unique grill assembly which ignites the charcoals in approximately three minutes, is cost free, for in the ignition of the charcoal, my grill makes use of old newspapers or other similar paper, which, of course, would otherwise be collected and thrown away. My invention also eliminates the necessity which many people have experienced of having combustible fuels about the house, which, of course, presents a definite fire hazard. The use of electricity with its inherent disadvantages as mentioned above is eliminated by the ingenious construction of my grill and its operation.

This invention is of particular advantage to users of charcoal grills because of the fact that the grill plate itself upon which the foodstuffs are cooked, is self-cleaning and does not require the usual brushing and scrubbing of grills of which I am now aware.

The grill which I have devised and the mechanism which is involved in the operation thereof, is simple to use and manipulate, and all of the elements thereof are of such construction and arrangement that the grill under normal usage will have long life. The mechanism which I have evolved for use in the broiling or cooking of foodstuffs insures that after the charcoal has been ignited and the aforesaid mechanism operated, the red or burning portions of the charcoal will be directed toward the foodstuffs being broiled or cooked so that the cooking or broiling operation will be substantially expedited. The grill of this invention also is economical to use, since, if it is properly used, a substantial saving of charcoal will result.

The self-cleaning grill and instant charcoal lighter is compact, the elements thereof are easily separable, so that the entire device may be easily stowed for transportation and the like in the trunk of an automobile or for storage, and the grill has been designed so that it is low enough to the ground so that the user thereof may, if he desires, sit in a chair to operate it and to do the cooking.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is an exploded view of the members which make up the entire grill assembly, such members being illustrated in readiness for being connected together so that the combustible material may be lighted and the charcoal ignited.

FIG. 2 is an exploded view showing the various members of the grill in reverse position relative to the position shown in FIG. 1, and with the members in position ready to be assembled into position for broiling or cooking the foodstuffs.

FIG. 3 is a view in section, with parts thereof broken away, with the members assembled together into operative position in readiness for lighting the combustible material and igniting of the charcoal.

FIG. 4 is a view in section with parts thereof broken away with the assembly in reversed position with respect to FIG. 3, and in operative position for broiling or cooking the foodstuffs.

In the accompanying drawings, I have used the numeral 1 to designate a metallic container of generally circular configuration which functions in the entire grill assembly as a fire box, and is provided with a heavy duty screen bottom 3, which serves not only as the bottom of the fire box 1, but also as a means for providing a draft for the paper P which is placed in the box, and as will become apparent as this description proceeds, provides fire for igniting the charcoal. The fire box 1 may be suitably supported on relatively short legs 5 which may, if desired, be of the hinged type in order to provide a fire box of more compact and stowable nature.

The fire box 1 is open at the top thereof and I affix by welding or the like, adjacent the upper edge thereof, a pair of latch members 7 which are disposed on the fire box 180° apart and include a hook or nose portion 9 which extends above the upper perimeter 11 of the fire box 1. I also affix by welding, or in any other suitable manner, a pair of cradle or journal members 13 which are diametrically opposed and are positioned between the latch members 7. Each journal member 13 includes a concave groove or bearing point 15 which extends above the upper perimeter 11 of the fire box 1.

The complete grill assembly includes, what I shall term a "combination grill and grate member," which I have designated in its entirety by the numeral 17. This combination grill and grate member 17 consists of a circular rim 19 which is of less diameter than the diameter of the upper open end of the fire box 1 and mounts, by welding or the like, a plurality of spaced apart parallel strand or rod-like members 21. On one side of the combination grill and grate member 17, and in the center thereof, I weld or otherwise secure to the strands 21 a connecting element designated generally by the numeral 23. Such connecting element comprising a flat base member 25 which may be welded to the strands 21 and to which is affixed and from which depends an internally threaded sleeve 27.

The complete grill assembly also involves a further member which I shall term, "the assembly controlling and operating member," and I have designated this member generally by the numeral 29. The member 29 is of circular configuration of substantially the same diameter as the member 17, and includes a perimeter which is formed of two semi-circular elements 31, each of which is welded at its ends to a journal rod 33 as at 35. The journal rod 33 is of greater diameter than the diameter of the member 29 to thereby provide a pair of projecting ends 37, which project or extend radially beyond the perimeter elements or rims 31. A plurality of strands 39 which are parallel to each other extend between and are affixed to the perimeter elements 31, each of the strands 39 being spaced apart a greater distance than the strands 21 of the member 17, such distance between adjacent strands 39 being sufficient to permit charcoal to pass therebetween at a specific time and for a purpose which will be hereinafter described. The journal rod 33 midway between the ends thereof may be provided with a hole therethrough, or such journal rod may be formed in two separate lengths so that a centrally disposed vertical screw 41 may be affixed to such journal rod to extend in each direction therefrom as at 43 and 45. The controlling and operating member 29 also includes an operating handle designated in its entirety by the numeral 47, such operating handle includes a steam 49 which is fixed at its inner end by any suitable means to the journal rod 33, and such stem extends radially from said journal rod to and extending outwardly beyond a perimeter element 31 where it is provided with a handle 51.

My assembly includes a further member which I shall term "an ignited charcoal supporting and draft preventing member." I have designated this member in its entirety by the numeral 53. The ignited charcoal supporting and draft preventing member 53 is circular in form and of substantially the same diameter as the diameter of the members 17 and 29 and includes a bottom portion 55 which is imperforate except for a central opening 57 therethrough. The member 53 also includes a depending annular flange or lip 59 which depends from the bottom 55 completely and continuously around the bottom 55. It will be understood that, if desired, this lip 59 may be eliminated.

I also provide a nut 61 which is employed in the assembly as one of the connecting media for connecting the various members together in a manner which will be explained hereinafter.

With the various members of the assembly in separated condition as particularly illustrated in FIG. 1 of the drawings, and when it is desired to use the grill, the fire box 1 is stuffed with single sheets of old newspapers, or the like, or of course, it will be understood that any type of loose, easily combustible material may be used. As soon as the container 1 is filled with the combustible newspapers or the like material, the controlling and operating member 29 is screwed on to the combination grill and grate member 17 by inserting the section 45 of the screw 43 of member 29 into the internally threaded sleeve 27 of the member 17, and then screwing the section 45 into the sleeve until the member 29 is thereby connected to the member 17 and a full supply of charcoal C may be placed on and about the member 17. It will be understood that the rim 19 of the member 17 is preferably of greater thickness than the strands 21 of the member 17 so that the charcoal will be maintained in ignitable position upon the member 17. With the members 17 and 29 connected together as described, they are mounted on the fire box 1 with the projecting journal ends 37 of the journal rod 33 cradled in the bearing surfaces 15 of the journal bearing members 13. Whereupon the outer end of the stem 49 of the element 47 is latched under either one of the hooks 9 of the latching members 7, so that the assembly involving the members 17 and 29 will be maintained in non-rotatable position supported on the fire box 1. When the members 17 and 29 are connected together as described, and mounted on the fire box in a manner as described, the charcoal C is positioned on and about the strands 21 of the member 17. It will thus be appreciated that the charcoal will be in ignitable position disposed on the member 17 and between 39, and with the assembly in this assembled condition, the paper P in the fire box 1 is lit and in approximately three minutes, the papers contained within the fire box 1 will have been consumed and the charcoal C on the member 17 will have been ignited or completely lit on the underside, or that side in the initial operation which is directed toward the burning paper P. Due to the burning of the paper P within the fire box 1, the combination grill and grate member 17 will have been completely cleaned by the fire so that the grease, etc. will have been eliminated therefrom. The next step in the operation consists of placing the charcoal holder and draft preventer 53 in operative position by placing it so that the section 41 of the screw 43 will project through the opening 57 and then the nut 61 is threaded on the externally threaded section 41 of the screw 43 which projects through and outwardly with respect to the member 53. It will now be appreciated that I have provided a removably connected assembly consisting of the fire box 1 and members 17, 29 and 53.

With the various members so connected and the charcoal C in red hot condition on one side, the assembly consisting of the members 17, 29 and 53 is turned over so that the cooking and broiling operation may be proceeded with. This is accomplished by unlatching the handle 47 from the latch 9 and by operating the handle causing the assembly consisting of the members 17, 29 and 53 to be reversed or revolved so as to cause the member 53 to comprise the bottom or charcoal holding member as disclosed especially in FIG. 4 of the drawings. The charcoal in this turning operation will rest on the member 53, with the red hot sides thereof facing upwardly, and since this member 53 is imperforate, the draft will be cut off. When the turning operation has been completed as illustrated in FIG. 4 of the drawings, the combination grill and grate will now be on the top of the assembly and will function as a grill upon which the foodstuff F to be cooked or broiled is placed, and the cooking operation is started. Now grill 17 can be raised by simply turning the grill assembly member 17 in a counter-clockwise manner and can be lowered by simply turning the grill assembly member 17 in a clockwise manner.

I claim:

1. A self-cleaning grill and instant charcoal lighter, including, in combination, a fire box adapted to contain combustible material for igniting charcoal, and an assembly rotatively mounted on said fire box, said assembly being disposed in one position on said firebox for igniting the charcoal and in another position for the cooking operation, and said assembly providing a member for supporting charcoal in the initial ignition thereof and also including a further member for receiving said ignited charcoal upon rotation of said assembly on said fire box for the cooking operation.

2. A self-cleaning grill and instant charcoal lighter in accordance with claim 1, wherein said assembly includes an assembly operating and controlling member for rotating said assembly to and from charcoal igniting and cooking positions.

3. A self-cleaning grill and instant charcoal lighter in accordance with claim 1, wherein said assembly includes a combination grill and grate member.

4. A self-cleaning grill and instant charcoal lighter in accordance with claim 1, wherein said second named member is imperforate.

5. A self-cleaning grill and instant charcoal lighter in accordance with claim 1, wherein said assembly includes a combination grill and grate member, an assembly operating and controlling member removably connected to said combination grill and grate member, and an ignited charcoal supporting and draft preventing member removably connected to said operating and controlling member, said members of said assembly being so relatively positioned and mounted on said fire box when the charcoal is being ignited that said combination grill and grate member is positioned adjacent to said fire box, and when said assembly is rotated, said combination grill and grate member is positioned remote from said fire box, and said ignited charcoal holder and draft preventing member is positioned adjacent to said fire box.

6. A self-cleaning grill and instant charcoal lighter in accordance with claim 5, wherein said combination grill and grate member supports the charcoal in the charcoal igniting operation and wherein said combination grill and grate member after rotation of the assembly supports the foodstuff being cooked.

7. A self-cleaning grill and instant charcoal lighter in accordance with claim 5, wherein said fire box is provided with oppositely disposed bearing points positioned above the upper perimeter of said fire box and said operating and controlling member comprises means rotatively seated in said bearing members for rotation of said assembly in the cooking operation.

8. A self-cleaning grill and instant charcoal lighter in accordance with claim 7, wherein said operating and controlling member includes a journal rod fixed thereto and having portions thereof extending beyond the perimeter of said operating and controlling member, and said portions being rotatively mounted in said bearing members.

9. A self-cleaning grill and instant charcoal lighter in accordance with claim 8, wherein said operating and controlling member has affixed thereto and extending radially beyond the perimeter thereof and beyond the perimeter of the fire box a handle member for manipulation to cause rotation of said assembly.

10. A self-cleaning grill and instant charcoal lighter in accordance with claim 9, wherein latch means are fixed to said fire box and extend above the upper perimeter thereof, and said handle means is removably connected to said latch means.

11. A self-cleaning grill and charcoal holder assembly, said assembly comprising a grate and an imperforate member removably attached to said grate and spaced therefrom, said grate adapted to support charcoal, or the like, for the ignition of the charcoal when mounted above said member and said member adapted to support the charcoal when said assembly is inverted and said assembly including means to mount the same on the rim of a fire box either in a first charcoal ignition position or in an inverted cooking position.

12. A self-cleaning grill and charcoal holder in accordance with claim 11 wherein, said imperforate member is provided with a flange extending toward and in engagement with said grate.

References Cited

UNITED STATES PATENTS 3,209,743   10/1965   Stewart et al. _____ 126—25

FREDERICK KETTERER, *Primary Examiner.*